United States Patent Office 3,153,610
Patented Oct. 20, 1964

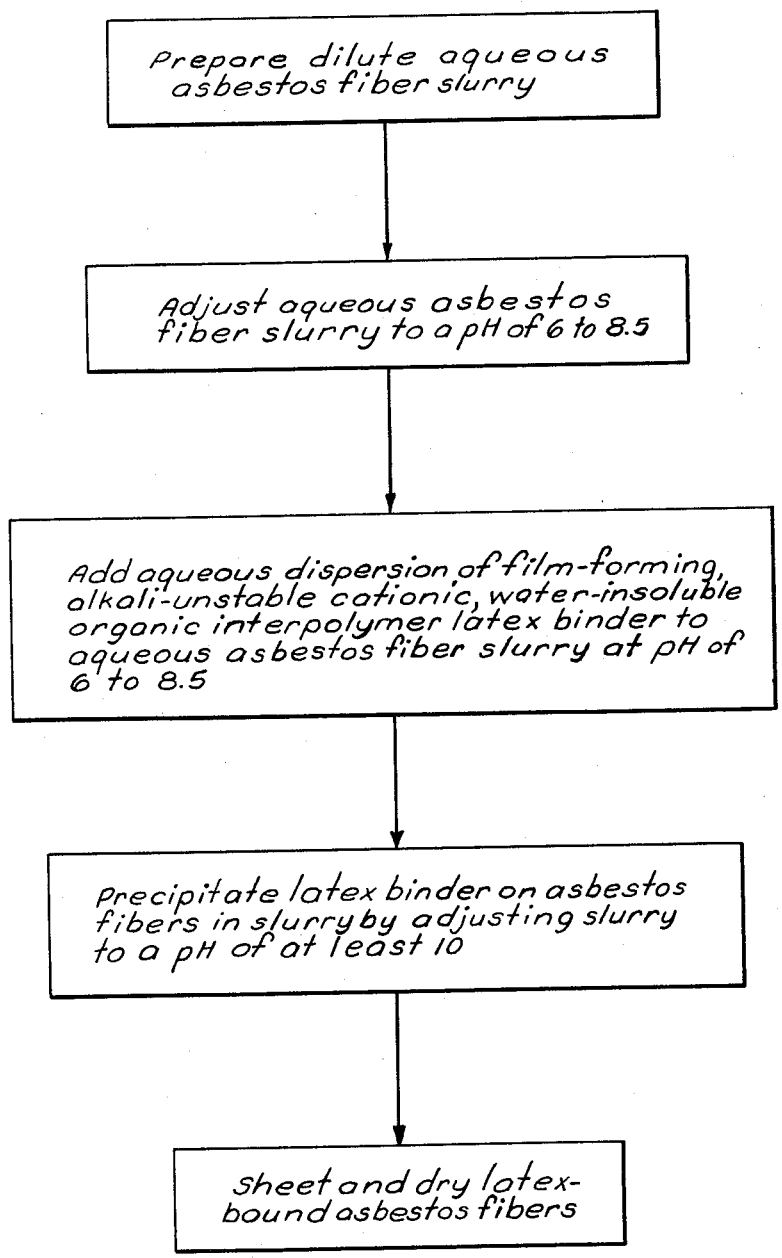

3,153,610
METHOD FOR PREPARATION OF ASBESTOS PAPER AND SHEETING
Edward J. Heiser, Sanford, and Robert W. Morgan, Saginaw, Mich., assignors to The Dow Chemical Company, Midland, Mich., a corporation of Delaware
Filed Jan. 8, 1962, Ser. No. 164,962
11 Claims. (Cl. 162—155)

The present invention appertains to the manufacture of felted asbestos products of improved strength, pliability and elasticity from a blend of an aqueous suspension of asbestos fibers and an aqueous dispersion or emulsion of an alkali-unstable, cationic, water-insoluble organic interpolymer latex. More particularly, the present invention appertains to a method for depositing a bonding agent in the condition described upon asbestos fibers in dilute aqueous suspension without thereby causing the fibers to form non-sheetable aggregates or clots. The invention includes the step of forming paper from the thus treated asbestos fibers and drying the paper at an elevated temperature to develop the strengthening properties of the bonding agent.

Asbestos paper, when formed in the absence of a binder, is a weak, brittle and almost friable product possessing such weak physical strength properties as to render the material of little or no practical utility. In the past, asbestos paper has been strengthened both by impregnation of a binder into the preformed asbestos sheet or by addition of a binding agent to an aqueous slurry of asbestos fibers, deposition of the binder containing stabilizing additives on the fibers to ameliorate the formation of aggregates or clots and subsequently sheeting and drying the fibers containing the binding agent. To minimize this problem of aggregates formation, special techniques have had to be developed which involve stabilization of the latex-fiber system with surfactants, chelating agents and the like.

An object of the present invention is to provide high quality felted asbestos papers by means of a simplified process wherein no special additives need to be incorporated in the cationic latex-fiber slurry to prevent aggregate formation or to obtain effective latex binder deposition on the asbestos fibers. Another object of the present invention is to provide an improved and efficient process for manufacturing felted asbestos products which substantially reduces the number of unsatisfactory batches produced and thus advantageously lessens the prospect of critically polluting public streams and similar water sources.

The invention is directed to a method for preparing felted asbestos paper having improved strength, pliability and elasticity by forming a dilute aqueous suspension of asbestos fibers, adjusting the pH of the asbestos fiber slurry so as to obtain a slightly acidic condition, adding a substantial amount of an aqueous dispersion of film-forming, alkali-unstable, cationic, water-insoluble, organic interpolymer latex binder, precipitating the film-forming latex binder on the asbestos fibers by adding a suitable amount of an alkaline reagent sufficient to appreciably raise the pH of the slurry to within a medium range of alkalinity and thereafter, sheeting and drying the fibers bearing the latex binding agent.

The drawing contains a flow diagram of the process of the invention.

The amino alcohol esters of α-methylene carboxylic acids whose salts are polymerically held in the film-forming cationic interpolymer latexes advantageously employed in practice of the present invention are represented by the formula

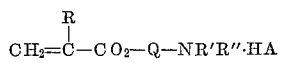

wherein the symbol R represents hydrogen, and an organic radical such as an alkyl radical having up to 4 carbon atoms, the symbol —Q— represents an alkylene radical, i.e., a bivalent aliphatic radical having its valence bonds on different carbon atoms, the symbols R′ and R″, being the same or different, represent hydrogen, hydrocarbon radicals or substituted hydrocarbon radicals, e.g. saturated or unsaturated acyclic or cyclic radicals such as methyl, ethyl, cyclohexyl, benzyl, aminoethyl, ethylaminoethyl and like radicals, including ones in which the group —NR′NR″ constitutes a heterocyclic radical, the group —Q—NR′R″ being the residue of an amino monohydric alcohol, and the symbol HA represents a salt-forming acid. Among such amino alcohol esters are ones in which the amino group is a primary amino group, a secondary amino group or a tertiary amino group.

Amino alcohol esters of this kind in which the amino group is a tertiary amino group are already known and are readily obtainable by interaction of the corresponding α-methylene carboxylic acid, acid chloride, or lower alkyl ester and the corresponding amino alcohol. For example, α-dimethylaminoethyl methacrylate can be made by reaction of methacryloyl chloride and 2-dimethylaminoethanol or by transesterification of methyl methacrylate with 2-dimethylaminoethanol. These methods are not usually applicable to amino alcohols having primary or secondary amino groups (which form amides instead of or in addition to the desired ester) unless these amino groups are sterically hindered.

Amino alcohol esters of α-methylene carboxylic acids and amino alcohols in which the amino group has at least one hydrogen atom (i.e., a primary or secondary amino group), which amino group is not sterically hindered and is separated from the ester linkage by from 2 to 3 carbon atoms in an alkylene radical, are described in a copending application, Serial No. 691,134, filed October 21, 1957, by Walter J. Le Fevre and David P. Sheetz, and now abandoned. Such esters are obtainable in accordance with that application in the form of hydrohalide salts by interaction of an α-methylene carboxylic acid halide and the hydrohalide salt of an amino aliphatic alcohol.

Specific examples of α-methylene carboxylic acids whose esters are contemplated in preparing the interpolymer latexes employed in the practice of this invention are acrylic acid, methacrylic acid, α-ethylacrylic acid, α-propylacrylic acid, α-butylacrylic acid, α-pentylacrylic acid, α-hexylacrylic acid, atropic acid, α-cyclohexylacrylic acid, α-furylacrylic acid and α-chloroacrylic acid.

Specific examples of amino alcohols whose esters are contemplated in the cationic, interpolymer latex preparation are 2-aminoethanol, 3-aminopropanol, 1-amino-2-propanol, 2-amino-2-methylpropanol, 2-aminobutanol, 3-aminobutanol, 3-amino-2-butanol, 3-amino-3-methyl-2-butanol, 2-methylaminoethanol, 2-dimethylaminoethanol, 2-ethylaminoethanol, 2-diethylaminoethanol, 3-methylaminopropanol, 3-dimethylaminopropanol, 3-ethylaminopropanol, 3-dimethylaminopropanol, 1-methylamino-2-propanol, 1-dimethylamino-2-propanol, 1-ethylamino-2-propanol, 1-diethylamino-2-propanol, 3-methylaminobutanol, 3-dimethylaminobutanol, 3-ethylaminobutanol, 3-diethylaminobutanol, 3-methylamino-2-butanol, 3-dimethylamino-2-butanol, 3-ethylamino-2-butanol, 3-diethylamino-2 - butanol, 2-(2-aminoethylamino)-ethanol, N-(2-hydroxyethyl)piperidine, 2-aminocyclohexanol, 2-methylaminocyclohexanol, 2-dimethylaminocyclohexanol, 2-benzylaminoethanol and α-aminoethylbenzyl alcohol.

The terms "aminoalcohol ester" and "aminoalcohol ester of α-methylene carboxylic acid" employed herein, designate esters of α-methylene carboxlic acids and amino monohydric alcohols according to the foregoing description.

Illustration of kinds of aminoalcohol esters of α-methylene carboxylic acids whose stable salts are interpolymerized with polymerizable ethylenically unsaturated compounds which interpolymers are employed in the asbestos fiber adhesive compositions of this invention are provided by the following specific examples: 2-aminoethyl acrylate, 2-aminoethyl 2-ethylacrylate, 2-aminoethyl 2-propylacrylate, 2-aminoethyl 2-butylacrylate, 2-aminoethyl 2-pentylacrylate, 2-aminoethyl 2-hexylacrylate, 2-aminoethyl 2-cyclohexylacrylate, 2-aminoethyl 2-chloroacrylate, 3-aminopropylacrylate, 1-amino-2-propylacrylate, 2-amino-2-methylpropylacrylate, 2-aminobutyl acrylate, 3-amino-2-butyl acrylate, 2-methylaminoethyl acrylate and 2-ethylaminoethyl acrylate.

In the preparatory practice of the cationic interpolymer latex binders of this invention, the aminoalcohol esters of α-methylene carboxylic acids are employed in the form of their water-soluble salts, preferably salts of the hydrogen halides, such as hydrochloric acid and hydrobromic acid, and salts of acids such as sulfuric acid and toluenesulfonic acid.

There are many known polymerizable, ethylenically unsaturated compounds that can be polymerized while dispersed in aqueous media by means already known per se to produce aqueous colloidal dispersions of substantially water-insoluble solid polymer products. These can now be advantageously polymerized in aqueous dispersions that comprise one of the amino-alcohol esters of the class defined above in accordance with this invention.

Among such other known polymerizable ethylenically unsaturated compounds are the alkenyl aromatic compounds, i.e., the styrene compounds, the derivatives of ethylenically unsaturated acids such as the acrylic esters, acrylic nitriles, maleic esters and unsaturated alcohol esters, and unsaturated ketones, unsaturated ethers and other compounds containing one or more ethylenic linkages capable of addition polymerization. Specific examples of such ethylenically unsaturated compounds are styrene, α-methylstyrene, ar-methylstyrene, ar-ethyistyrene, α,ar-dimethylstyrene, ar,ar-dimethylstyrene, vinylnaphthalene, hydroxystyrene, methoxystyrene, cyanostyrene, acetylstyrene, monochlorostyrene, dichlorostyrene and other halostyrenes, methyl methacrylate, ethyl acrylate, butyl acrylate, hexyl acrylate, lauryl methacrylate, phenyl acrylate, acrylonitrile, methacrylonitrile, acrylanilide, ethyl α-chloroacrylate, ethyl maleate, polyglycol maleate, vinyl chloride, vinyl bromide, vinylidene chloride, vinylidene bromide, vinyl methyl ketone, methyl isopropenyl ketone, vinyl ethyl ether, 1,3-butadiene, isoprene and the like.

The improved process of polymerization for preparing the cationic interpolymer latexes employed according to this invention comprises preparing an aqueous composition comprising a non-alkaline, e.g. neutral to acidic, aqueous medium, one or more of the class of the water-soluble salts of amino-alcohol esters of α-methylene carboxylic acids and one or more of the class of other polymerizable ethylenically unsaturated compounds that are capable of forming substantially water-insoluble addition polymers.

The aqueous starting composition comprising the polymerizable material may optionally contain conventional emulsifiers, wetting agents, surfactants and the like, although such constituents can be omitted from the starting composition and, if used, can usually be employed in smaller proportions in accordance with this invention than is possible with known polymerization processes.

The aqueous starting composition comprising the polymerizable material may contain polymerization catalysts of kinds already known to promote emulsion polymerizations. Among such catalysts are water-soluble oxidizing agents such as hydrogen peroxide and potassium persulfate and catalysts which, like the redox catalysts, are activated in the water-phase, e.g., by a water-soluble reducing agent. A particularly desirable catalyst system comprises hydrogen peroxide and ferric ions in an aqueous medium having a pH value not greater than 3. The starting composition may include acids or salts to provide a desired pH value and possibly a buffered system.

The advantages of the present invention are attained when the starting aqueous composition comprises from 0.1 to 10, preferably from 0.5 to 5, percent by weight of an amino-alcohol ester of an α-methylene carboxylic acid the weight of all of the other polymerizable ethylenically unsaturated constituents being based on 100 percent by weight of the combined weights of the total monomeric composition. The other constituents of the starting composition can be employed in usual proportions already known in this art. For example, the starting aqueous composition usually contains from 5 to 60 percent by weight of the polymerizable constituents and correspondingly from 95 to 40 percent by weight of the aqueous medium, although proportions outside of these ranges can be used.

The starting composition, as described above, is subjected to conditions conducive to polymerization of the polymerizable constituents. In most instances, the starting composition is agitated and the temperature is raised, e.g., to a temperature in the range from 40° C. to 100° C. to activate the polymerization, although in some instances, particularly those wherein the composition comprises a very active polymerization catalyst, the polymerization can occur at or below room temperature. Other means, such as exposure of the composition to activating radiations, can be employed to promote polymerization of the polymerizable constituents.

The polymerization process of the instant cationic latex binding agents also contemplates embodiments in which all of the constituents are charged to the starting mixture, and are polymerized therein in a single step, as well as embodiments in which the constituents are charged in a sequence, perhaps coordinated with a polymerization sequence, and/or the polymerization is carried out in plurality of stages. The amino alcohol ester of the α-methylene carboxylic acid can advantageously be added to the polymerization reaction mixture prior to the polymerization step or at any time prior to the complete polymerization of the polymerizable constituents.

When the compositions comprising a salt of an amino-alcohol ester of an α-methylene carboxylic acid and a different polymerizable ethylenically unsaturated compound dispersed in an aqueous medium are polymerized, there are obtained aqueous colloidal dispersions of polymeric products, commonly called synthetic polymer latexes or simply latexes, which contain the starting amino alcohol ester and one or more of other ethylenically unsaturated compounds in polymerically combined form.

The following are types of alkali-unstable, cationic, water-insoluble interpolymer latexes that are applicable for the instant purpose. Satisfactory results are generally attained when these latex modifiers for the asbestos fiber products are employed in the form of aqueous dispersions having a latex solids content of from about 5.0 to about 20.0 percent. The useful latexes are additionally characterized as film-forming by air-drying at a temperature of less than about 40° C. This means that the latexes should be capable of forming a continuous, coherent film at a temperature of about 40° C. Without the assistance of any chemical or physical curing or drying aids. Among these suitable interpolymer latexes can be included those composed of monomeric components interpolymerized in the indicated approximate percentage weight ratios: 0.6 percent 2-aminoethyl methacrylate hydrochloride/ 39.8 percent methyl methacrylate/59.6 percent N-butyl acrylate; and 3.4 percent 2-aminoethyl methacrylate hydrochloride/58 percent styrene/38.6 percent N-butyl acrylate. However, a particularly satisfactory latex binder for purposes of this invention is a cationic, water-insoluble, interpolymer latex capable of forming a continuous, coherent film under conditions stipulated above which is composed of an interpolymer containing about 0.8 percent by weight of 2-aminoethyl methacrylate hydrochloride/ about 39.8 percent by weight of 1,3-butadiene/and about 59.4 percent by weight of styrene.

Advantageously, three standard classes of milled asbestos may be employed in fiber slurries for the preparation of the latex-modified asbestos products of the invention. These classes of asbestos fibers include paper fiber grade (Group No. 5); waste, stucco or plaster grade (Group No. 6); and refuse or shorts grade (Group No. 7). The accepted standard method of grading asbestos fibers established by the Canadian National Research Council, Associate Committee on Asbestos Research, is set forth in detail on pages 236–239 of W. E. Sinclair's book entitled "Asbestos, Its Origin, Production and Utilization," published by Mining Publications, Ltd., London, 1955. Briefly described, this standard method of grading asbestos fibers involves weighing of fibers in ounces and measuring of fiber lengths retained on each layer of a nested series of three graded screens plus a pan which are agitated by means of an eccentric driving force which thereby imparts an elliptical motion to the set of superimposed screened boxes to obtain a sifting action. The testing appliance used is known as the Quebec Standard Asbestos Testing Machine.

To make the standard asbestos fiber test known as the Guaranteed Minimum Shipping Test, a sample of asbestos weighing 16 ounces is put on the top tray of the testing appliance, identified above, which is securely covered by a lid. The machine is then run at a rate of 300 r.p.m. at the shaft of the eccentric for exactly two minutes as regulated by means of an automatic timing device.

The action of the machine causes the whole nest of boxes to be given a regular shaking movement which results in the shortest fibers in the sample to drop through from the top box to either box 2 or 3, according to its length, while the finest material falls into the bottom pan. After the two-minute test, the fiber in each tray is weighed and the results indicate the proportionate length of fiber contained in the product, including possibly any gritty material which usually finds its way to the bottom pan.

In the milled asbestos groups already referred to, the different grades are designated and subdivided according to a scale of standard test figures represented by the amount of fiber retained in each box when a sample is tested.

Grades of asbestos fibers that may be employed in the latex-modified asbestos sheeting products of the invention fall within a wide range commencing with Group 5 maximum weight asbestos fibers and terminating with Group 7 medium weight fibers that in accordance with the Guaranteed Minimum Shipping Test have a distribution of fiber weights as determined on a standard 16 ounce screened sample. These Group 5 maximum and Group 7 medium asbestos fiber weight distribution data are:

Table A

| Quebec Standard Asbestos Testing Machine Sieves | Asbestos Fiber Sample Wt. | |
|---|---|---|
| | Group 5 (max.) | Group 7 (med.) |
| Box No. 1 | 0 | 0 |
| Box No. 2 | 1.5 | 0 |
| Box No. 3 | 9.5 | 0 |
| Box No. 4 | 5.0 | 16 |

For purposes of experimentation of the three representative grades of asbestos fibers utilized, "6D," a stucco grade fiber (having a sample weight distribution of 0–0–7–9), was found to be superior to both "5R," a longer fibered paper grade (having a sample weight distribution of 0–0–10–6) and "7R–2," a refuse, short fibered grade (having a sample weight distribution of 0–0–0–16). This was somewhat unexpected that "5R," a paper grade asbestos fiber, consists predominantly of longer fibers than the other two grades. The longer fibers, within limits, presumably would ordinarily be conductive to the increasing of tensile strength of an asbestos sheet containing these longer fibers.

In accordance with the present method for preparing felted latex-modified asbestos paper adjustment of the pH of the asbestos fiber slurry to a pH between about 6 and 8.5 and preferably between about 6.0 and 6.5 may be effectively accomplished by admixing into the slurry a dilute 10 weight percent aqueous solution of a mineral acid, such as nitric acid, hydrobromic acid, sulfuric acid, sulfurous acid, nitric acid, nitrous acid, phosphoric acid, phosphorous acid and the like. However, particularly advantageous results are obtained by the employment of a dilute 10 weight percent aqueous solution of hydrochloric acid.

A number of strongly alkaline water solutions may be satisfactorily employed in the invention to raise the pH of the latex-modified asbestos fiber slurry to a medium range of alkalinity, e.g. pH 10. The alkaline adjustment of the instant slurry accomplishes the desired precipitation of the film forming latex binder onto the asbestos fibers. These latex-modified asbestos fibers are used to ultimately produce asbestos paper products of the invention having superior physical properties. Among the alkaline compounds, that may be employed to prepare the aqueous latex precipitating solutions, are hydroxides of sodium, potassium, barium, lithium, strontium and the like as well as their various salts which form strongly alkaline solutions when dissolved in water. Although strongly alkaline solutions of the compounds indicated above would bring about the desired latex precipitation, for the purposes of this invention, ammonium hydroxide which is readily obtained and conveniently handled is a preferred alkaline reagent. For instant purposes, a highly satisfactory precipitation of the film-forming, alkali-unstable, cationic, water-insoluble, interpolymer latex onto the asbestos fibers is achieved by the admixing of about a 28 weight percent aqueous ammonium hydroxide solution to the latex-modified asbestos fiber slurry.

According to the preferred embodiment of the invention, the asbestos fibers are dispersed as a solids level of from about 0.5 to 2.0 percent by weight in distilled water employing any of several types of suitable mixing apparatus, such as a compressed air-driven stirrer, a Waring Blendor, a one and one-half pound Valley beater or the like. However, the compressed air-driven open wing blade stirring apparatus and the Valley beater provide the most suitable degree of agitation for dispersing the asbestos fiber slurry in the most efficient manner.

The method of fiber slurry preparation demonstrated a perceptible influence on the ultimate physical properties of the handsheets formed of latex-bound asbestos fibers of the invention. Advantageously, the asbestos fiber slurries are prepared by thoroughly dispersing the fibers so as to break up all asbestos fiber clumps which frequently form upon addition of the fibers to the aqueous dispersion media. At the same time, agitation of the dispersion media, when the asbestos fibers are being dispersed therein, should be vigorous but not of sufficient severity to cause excessive shortening of the natural fibers due to cutting or breaking. Handsheet test samples formed from fibers dispersed by the vigorous agitation provided by means of a compressed air-driven open wing blade stirrer showed nearly twice the tensile strength in comparison to handsheets formed from the same grade asbestos fibers which were dispersed in water by means of the severe agitation conditions provided by a Waring Blendor. Fiber slurries prepared by mixing the ingredients with a Waring Blendor for about one minute caused formation of extremely short fiber lengths. Operation of the same Blendor for about 10 seconds in preparation of an asbestos fiber slurry, varied the results either by shortening the "5R" grade fibers to a condition approximating a "6D" fiber grade or the shorter period of Blendor agitation dispersed the fibers sufficiently to substantially eliminate clumping of the fibers. It is highly possible that a combination of the two effects, described above, was realized. Handsheet test samples fabricated from slurried asbestos fibers initially dispersed in water by means of mixing provided by a Valley beater apparatus of the type previously identified, for the most part, showed generally excellent physical properties comparable to the handsheet test samples prepared from aqueous fiber slurries dispersed by means of the compressed air-rotated open wing blade stirrer. When operating in the beater apparatus, the bed plate attachment was not raised or elevated on the central shaft and the beating cycle was limited to a period of from about 5 to 10 minutes. Maintenance of the instant conditions of beater operation provided thorough dispersion of the asbestos fibers resulting in a substantial elimination of undesirable fiber severing.

The hydrogen ion concentration or pH of the asbestos fiber slurry proved to be of primary importance in influencing the performance of the film-forming, cationic, latex binder at the time of addition and mixing of this latex modifier into the fiber slurry. In the presence of highly acidic latex-modified asbestos fiber slurries, the asbestos fibers tend to degrade by becoming shortened and/or gelatinize with the result that handsheets cannot be formed satisfactorily. The improved aqueous cationic latex binder dispersions, when admixed with an asbestos fiber slurry having a pH value within the range of from 6 to 8.5, appear to retain their stability and provide a complete and satisfactory "let down" or adhesion of the latex binder to the asbestos fibers when the pH value of the aqueous latex-modified asbestos slurry was raised to at least 10.0 and higher. The highest tensile strength test results were attained on fabricated handsheet samples made from latex-modified asbestos fiber slurries employing the pH adjustment procedure of the latex-modified asbestos fiber compositions just described. When the improved film-forming alkali-unstable, cationic interpolymer latexes were admixed with a fiber slurry having an adjusted pH value of at least 10.0, immediate "let down" occurred and tensile strength properties of the resulting fabricated handsheets were generally quite low. Non-uniform latex binder distribution and interpolymer particle coalescence in the asbestos fiber slurry were considered to contribute largely to this dissatisfactory condition.

Mixing intensity of the latex-modified asbestos fiber slurry during the "let down" stage can have a highly satisfactory effect on the performance capabilities of the latex binder modifier. Vigorous agitation that produced a thorough mixing action tended to bring about a rapid and effective equilibration of pH resulting in immediate polymer "let down" throughout the entire fiber slurry. Vigorous or strong agitation at this important stage in the process tends to emulsify any loosely formed fiber-binder agglomerates which provided for the allowance of uniform fiber deposition during handsheet fabrication. In contrast, mild agitation that provided a moderate mixing action produced none of these beneficial effects and resulted in handsheets possessing considerably lower tensile strength properties.

The advantages of the present invention can best be described by way of the following examples, which are given for the purpose of illustration only, and they are not intended to limit the scope of the invention in any manner. For example, any of the alkali-unstable, cationic, water-insoluble interpolymer latexes as disclosed that form continuous, coherent films at about 40° C. without the assistance of chemical or physical means of curing and any of the gradations of asbestos fibers previously indicated may be used in place of the cationic interpolymer latex binders and asbestos fiber grades employed to illustrate these examples. Proportions of ingredients are indicated on a percentage weight basis unless otherwise stated.

EXAMPLE 1

In a suitable container equipped with an air-driven open wing blade stirring apparatus, "5R" grade asbestos fibers were dispersed at about a 2.0 weight percent consistency in distilled water with vigorous agitation. Subsequently, the pH of the asbestos fiber slurry was reduced to within the range of from about 6.0 to 6.5 as measured by a Beckman Model H–2 pH meter by means of the addition of a 10 weight percent aqueous solution of hydrochloric acid.

The latex-binder component used was an aqueous dispersion of a film-forming cationic, alkali-unstable, water-insoluble interpolymer containing 0.8 weight percent of 2-aminoethyl methacrylate hydrochloride, 39.8 weight percent of 1,3-butadiene and 59.4 weight percent of styrene. The aqueous cationic latex dispersion was adjusted to a level of about 10 percent polymer solids by the addition of water to prepare the aqueous film-forming latex-binder dispersion to be added to the asbestos fiber slurry.

The binder dispersion was then metered into the asbestos fiber slurry at levels of about 20, 40 and 60 percent (weight basis—latex solids on fiber solids). After a short period of mixing to allow for a uniform distribution of the latex throughout the fiber slurry, the latex was caused to coagulate or "let down" upon the fibers by raising the pH of the slurry to about 10.0. This adjustment of the slurry pH was accomplished by employing a 28 weight percent aqueous solution of ammonium hydroxide.

During the entire operation, the fiber slurry was agitated vigorously in the manner described above at a rate of about 1200 revolutions per minute.

The cationic latex-modified asbestos fibers were formed into handsheets using a British standard sheet mold in accordance with TAPPI Standard Method T205, m–53. Handsheets were couched from the mold screen and wet pressed for about one minute at a pressure of about 60 pounds per square inch (p.s.i.). Immediately thereafter, the pressed handsheets were cured or dried for about 10.0 minutes in a forced air circulating oven at a temperature maintained at about 220° F.

Following a conditioning period of about 24 hours at a temperature of about 72° F. in an atmosphere having a relative humidity of about 65 percent, the handsheets were tested for dry tensile strength and wet tensile strength in accordance with TAPPI Standard Method T404, m–50. Test specimens of about 4 inches in width by about 15 millimeters in length were pulled using a Model TM Instron tensile strength testing machine which was operated at a crosshead speed of about 1 millimeter per minute. In those instances involving wet tensile strength measurements, the handsheet test specimens were immersed in distilled water for a period of about 24 hours prior to testing. The following results, shown immediately hereafter in Table B, were obtained. The physical properties demonstrated by a commercial asbestos paper were measured as control samples for purposes of comparison.

Table B

| Latex Loading in Weight Percent | Dry Tensile Strength in lbs./15 mm. | Wet Tensile Strength in lbs./15 mm. |
| --- | --- | --- |
| 20 | 10.1 | 3.1 |
| 40 | 15.5 | 5.2 |
| 60 | 24.8 | 9.0 |
| 0 (control) | 1.0 | 1.0 |

EXAMPLE 2

Asbestos paper handsheets were prepared by dispersing "5R" grade asbestos fibers at about a 2.0 weight percent consistency in distilled water by means of agitation provided by a 1½ pound Valley laboratory beater apparatus.

The fiber was circulated in the beater for about five minutes using no bed plate pressure. Seven hundred milliliter portions of the slurry were then removed and placed in glass jars. Subsequently, the individual slurry samples were circulated by means of an air stirring open wing blade apparatus when the latex modifier was added.

The individual 700 milliliter slurried samples of asbestos fibers were acidified with about 2.0 milliliters of an aqueous 10 percent by weight hydrochloric acid solution. Thereafter, about a 10 percent aqueous latex-based dispersion was added. The latex-based dispersion was a dispersion of a film-forming, cationic, alkali-unstable, water-insoluble interpolymer containing 0.8 weight percent of 2-aminoethyl methacrylate hydrochloride, 39.8 weight percent of 1,3-butadiene and 59.4 weight percent styrene in interpolymerized form.

After thoroughly mixing the aqueous latex-based dispersion into each of the asbestos fiber slurry samples, about 1.0 milliliter of about a 28 weight percent aqueous solution of ammonium hydroxide was added. The ammonium hydroxide solution precipitated the latex on the asbestos fibers. In turn, each resultant latex-modified asbestos fiber slurry was then diluted with water to a capacity of about 4.0 liters and poured into a British sheet mold wherein a handsheet was formed. Immediately after formation, the handsheets were pressed for about 1.0 minute at a pressure of about 60 pounds per square inch (p.s.i.) and after pressing, were dried in an air-circulating oven for about 10 minutes at a temperature maintained at about 220° F.

Handsheets made by this procedure were tested for dry and wet tensile strength. Results of these tests showed these 4 inch by 15 millimeter handsheet specimens to withstand a range of from about 20 to 30 pounds for dry tensile strength. Results of the wet tensile strength tests on similarly prepared handsheets in this series showed a range of values for wet tensile strengths which are from about 35 to 45 percent of the values of the dry tensile strength values indicated above.

EXAMPLE 3

Employing the procedures set forth in Example 1, asbestos fiber sheets showing similarly improved and comparable dry and wet tensile strength properties were prepared employing another aqueous dispersion of a film-forming, cationic, alkali-unstable, water-insoluble interpolymer latex binder containing 0.6 weight percent 2-aminoethyl methacrylate hydrochloride, 39.8 weight percent methyl methacrylate and 59.6 weight percent N-butyl acrylate. The indicated aqueous latex-binder dispersion had an interpolymer solids content of about 10 weight percent when added to the asbestos fiber slurry.

The foregoing description and examples sufficiently illustrate the improved method for preparation of felted asbestos paper set forth in this invention. Variations may be made in the method disclosed above without departing from the spirit and scope of the invention.

What is claimed is:

1. A method for preparation of felted asbestos paper which comprises: (1) forming an aqueous slurry of asbestos fibers; (2) adjusting the pH of said slurry to within the range of from about 6 to 8.5; (3) admixing with said slurry a film-forming latex binder composed of from 5.0 to 20 weight percent non-volatile solids of an aqueuos dispersion of an alkali-unstable, cationic, water-insoluble organic interpolymer latex composed of (A) from about 0.1 to 10 weight percent of an interpolymerizable water-soluble salt of an amino alcohol ester of an α-methylene carboxylic acid representable by the formula

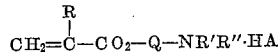

wherein R is selected from the group consisting of hydrogen, and an alkyl radical having up to 4 carbon atoms, Q is an alkylene radical containing therein a bivalent aliphatic radical having its valence bonds on different carbon atoms, R' and R'', are independently selected from the group consisting of hydrogen, hydrocarbon radicals containing up to 8 carbon atoms, and substituted hydrocarbon radicals and HA is a salt-forming acid selected from the group consisting of hydrochloric, hydrobromic, sulfuric and toluenesulfonic acid, said water-soluble salt of an aminoalcohol ester of an α-methylene carboxylic acid being interpolymerized with (B) a weight percentage of at least one other interpolymerizable water-insoluble ethylenically unsaturated monomer such that the combined weights of all interpolymerizable components combined therein equal 100 weight percent; (4) adjusting the pH of the latex binder-modified asbestos fiber slurry to at least 10; and (5) sheeting and drying the latex-modified asbestos fiber composition.

2. The method of claim 1, wherein said asbestos fibers are selected from grades of milled asbestos fibers consisting of paper fiber, Group 5; waste, stucco and plaster fiber, Group 6; and refuse and short fibers, Group 7.

3. The method of claim 1, wherein said aqueous slurry of asbestos fibers contains from about 0.5 to 2.0 percent by weight of fiber solids in water.

4. The method of claim 1, wherein said pH of said slurry of Step 2 is adjusted to a pH within the range of from about 6 to 8.5 with an aqueous mineral acid solution.

5. The method of claim 4, wherein said mineral acid is hydrochloric acid.

6. The method of claim 1, wherein said pH of said latex binder-modified asbestos fiber slurry of Step 4 is adjusted to a pH of at least 10 with an aqueous solution of an alkaline reagent.

7. The method of claim 6, wherein said alkaline reagent is ammonium hydroxide.

8. The method of claim 1, wherein said latex is composed of 0.8 weight percent of 2-aminoethyl methacrylate hydrochloride, 39.8 weight percent of 1,3-butadiene and 59.4 weight percent of styrene in interpolymerized form.

9. The method of claim 1, wherein said latex is composed of 0.6 weight percent of 2-aminoethyl methacrylate hydrochloride, 39.8 weight percent of methyl methacrylate and 59.6 weight percent of n-butyl acrylate in interpolymerized form.

10. The method of claim 1, wherein said latex is composed of 3.4 weight percent of 2-aminoethyl methacrylate hydrochloride, 58 weight percent of styrene and 38.6 weight percent of n-butyl acrylate in interpolymerized form.

11. A method for preparation of felted asbestos paper which comprises: (1) forming an aqueous slurry of "6D" grade asbestos fibers having a fiber solids content of about 2.0 weight percent; (2) adjusting the pH of said slurry to within the range of from about 6.0 to 6.5; (3) admixing into said slurry of Step 2 a film-forming latex binder composed of an aqueous dispersion of an alkali-unstable, cationic, water-insoluble organic interpolymer latex containing 0.8 weight percent of 2-aminoethyl methacrylate hydrochloride, 39.8 weight percent of 1,3-butadiene and 59.4 weight percent of styrene in interpolymerized form, said latex binder being employed at a latex solids level of about 10.0 percent; (4) adjusting the pH of the latex binder-modified asbestos fiber slurry of Step 3 to about 10; and (5) sheeting and drying the latex-modified asbestos fiber composition of Step 4.

References Cited in the file of this patent

UNITED STATES PATENTS

| | | |
|---|---|---|
| 2,744,884 | Benneville | May 8, 1956 |
| 2,797,163 | Smith | June 25, 1957 |
| 3,066,066 | Keim | Nov. 27, 1962 |

FOREIGN PATENTS

| | | |
|---|---|---|
| 637,227 | Great Britain | May 17, 1950 |